United States Patent
Muraki et al.

(10) Patent No.: US 6,697,886 B1
(45) Date of Patent: Feb. 24, 2004

(54) DATA RECEIVER AND DATA TRANSMITTER

(75) Inventors: Kenji Muraki, Osaka (JP); Satoshi Kondo, Yawata (JP); Jiro Yamada, Souraku-gun (JP); Yasushi Ayaki, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/700,845
(22) PCT Filed: May 25, 1999
(86) PCT No.: PCT/JP99/02752
§ 371 (c)(1), (2), (4) Date: Nov. 21, 2000
(87) PCT Pub. No.: WO99/62228
PCT Pub. Date: Dec. 2, 1999

(30) Foreign Application Priority Data

May 26, 1998 (JP) .............................. 10-143874

(51) Int. Cl.⁷ .............................. G06F 3/12; G06F 3/00; H04L 12/44
(52) U.S. Cl. .............................. 710/36; 710/20; 710/62
(58) Field of Search .......................... 710/3.5, 7, 9–12, 710/15, 18, 20, 25, 36, 48, 62; 709/206, 236

(56) References Cited

U.S. PATENT DOCUMENTS 6,065,067 A * 5/2000 Hobson et al. ................. 710/8
6,078,783 A * 6/2000 Kawamura et al. ........ 725/120
6,108,718 A * 8/2000 Fujimori et al. ............... 710/9
6,185,632 B1 * 2/2001 Berkema ...................... 710/20
6,272,546 B1 * 8/2001 Ludtke ......................... 709/231

FOREIGN PATENT DOCUMENTS

| JP | 10-172239 | 6/1998 |
|---|---|---|
| JP | 10-285196 | 10/1998 |
| JP | 11-168483 | 6/1999 |

OTHER PUBLICATIONS

AV/C DISC Subunit Proposal version 0.7 dated Apr. 15, 1998.

* cited by examiner

Primary Examiner—Kim Huynh
(74) Attorney, Agent, or Firm—Smith, Gambrell & Russell, LLP (57) ABSTRACT

A signal data receiving device for receiving data via a digital interface. The signal data receiving device has a receiving terminal data holding device for holding data concerning a state of a terminal via which data is received, and wherein the terminal state data includes terminal operating mode information. Suspend reasons concerning suspend in the operating mode information are classified using a receiving data state and a device operation state as classification criteria. These classifications and each classified suspend reason are capable of being displayed on another device connected to the digital interface.

17 Claims, 8 Drawing Sheets

PRIOR ART

PRIOR ART

Fig. 8

PRIOR ART

DATA RECEIVER AND DATA TRANSMITTER

TECHNICAL FIELD

The present invention relates to a data reception and transmission method that controls recording and playback devices for disks, tapes, or the like via a digital interface.

BACKGROUND ART

In recent years, the IEEE (The Institute of Electrical and Electronics Engineers, Inc.) 1394 method has been attracting attention as a serial transmission method. The IEEE 1394 method can be used not only for the transmission of computer data traditionally supported by SCSI (small computer system interface) and other systems, but also for the transmission of AV data such as audio and video data. This is because two communication methods, asynchronous and isochronous, are defined for the IEEE 1394 method. Isochronous communication is a data transmission method that can be used for the transmission of data such as AV data that has a real-time requirement. In isochronous communication, the bandwidth required for the transmission of data is secured prior to the initiation of the transmission. Then, the data transmission is performed using the thus secured bandwidth. This ensures the real time transmission of the data. Asynchronous communication, on the other hand, is a transmission method used for the control of devices and the transmission of data such as computer data that does not have a real-time requirement.

Various methods have been proposed to provide transmission protocols for IEEE 1394. One of them is a protocol called the AV protocol. The AV protocol is expected to be standardized as IEC (International Electrotechnical Commission) 61883, and defines such methods as isochronous transmission and reception of time-critical AV data and asynchronous transmission and reception of commands to be given to devices.

IEEE 1394 uses a concept called "plug" in order to handle the input and output of AV data in AV playback devices or recording/playback devices for compact discs (hereinafter CDs), minidiscs (hereinafter MDs), etc. The plug is a virtual connection terminal between AV devices, and is responsible for the transmission and reception of isochronous communication data, asynchronous communication data, etc. In a combination device incorporating a plurality of functions into one unit, the plug may be provided for each function unit. For example, a combination CD and radio cassette player/recorder is considered to be a combination of the various function units, i.e., the CD player, the tuner (radio), and the cassette tape recorder.

There are two types of plug: the receiving plug for receiving data from the outside and the transmitting plug, for transmitting data to the outside. These plugs have their own attributes and operating states. In the AV protocol, however, no methods are defined for handling information concerning these plugs. In view of this, there have been proposed a method of holding these pieces of information in a list structure and a method of externally accessing the list. One example is the AV/C DISC Subunit Proposal version 0.7 presented at the IEEE 1394 Trade Association (hereinafter TA).

The plug is a virtual and functional concept for handling AV data, and does not refer to a physical terminal itself on the IEEE 1394 bus. In some cases, the plug may directly handle the data of an analog input/output terminal or data of an optical input/output terminal that handles ICE 958 data.

The IEEE 1394 bus is capable of transmission at 100, 200, and 400 Mbps with a single terminal; for comparison, the linear PCM signal used for input and output of MD, for example, is 1.4 Mbps for two channels. This means that one IEEE 1394 terminal has a sufficient capacity to handle both input and output simultaneously. Furthermore, device control signals can also be handled at the same time. In the following description, the receiving plug, the transmitting plug, and control signals are described as if they were independent terminalis, but it will be noted that the plug is nothing but a virtual and functional concept, and that the number of IEEE 1394 terminals physically mounted on an actual device is one or two or so (for the cascading of devices).

The prior art plug information handling proposed in the above draft of standard (AV/C DISC Subunit Proposal version 0.7) will be described below with reference to drawings.

Figure 5:
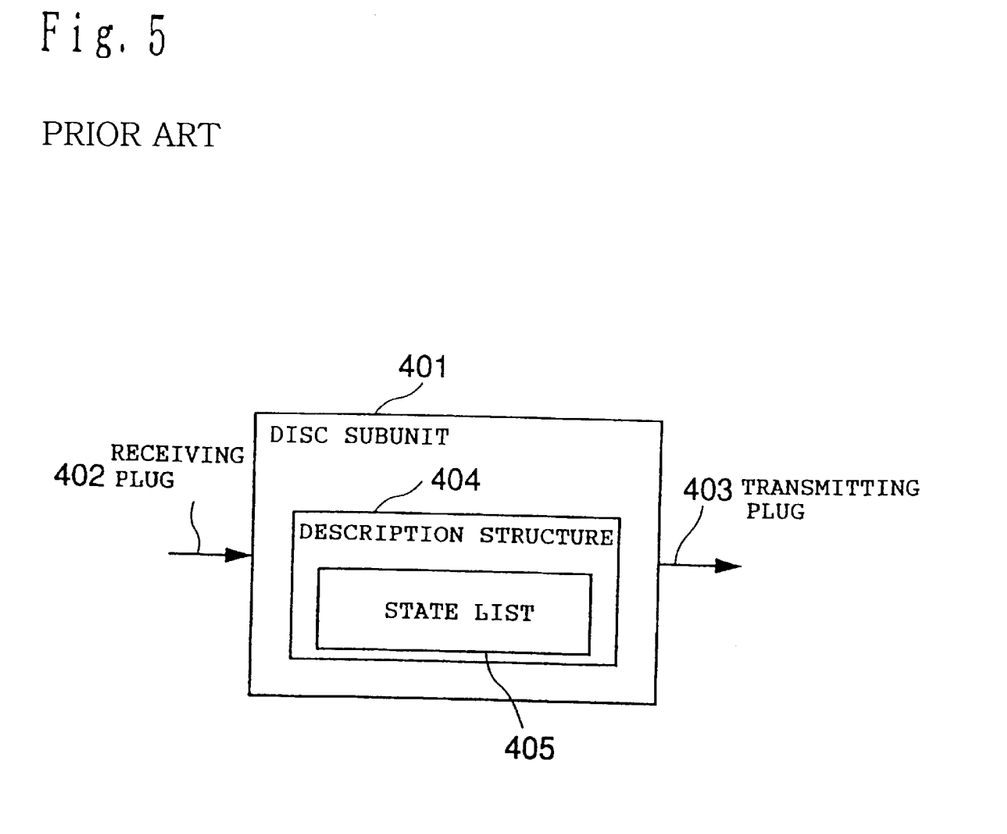
FIG. 5 is a block diagram showing the configuration of a recording/playback disc subunit according to the prior art.

FIG. 5 is a block diagram showing a recording and playback disc subunit according to the prior art. One or a plurality of such subunits together constitute one device. In FIG. 5 reference numeral 401 is the disc subunit (hereinafter sometimes referred to simply as the subunit), 402 is a receiving plug, 403 is a transmitting plug, 404 is a description structure called a descriptor, and 405 is a state list, included in the description structure 404, for showing the state of the subunit. FIG. 5 assumes the use of MD; therefore, one receiving plug and one transmitting plug are provided. Here, a stereo signal can be handled by one plug.

The description structure 404 includes attribute information and state information of the subunit 401, attribute information and contents information of media, etc. in the form of a list structure, and is used to transmit/receive information between subunits. The details of how reading and writing is performed on each list are described in the AV/C Digital Interface Command Set General Specification published by the IEEE 1394 TA.

Figure 6:
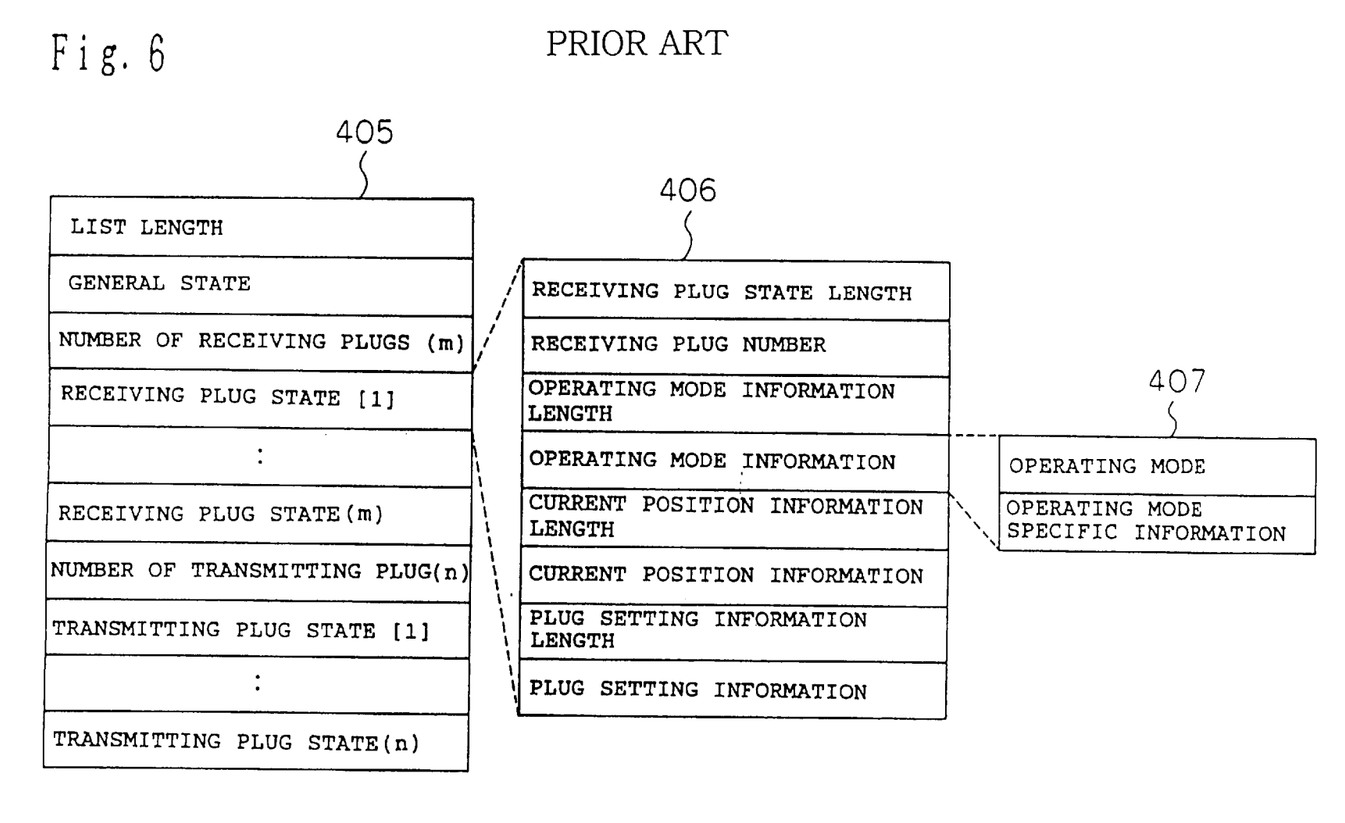
FIG. 6 is a conceptual diagram showing the structure of a state list according to the prior art.

FIG. 6 is a diagram showing the structure of the state list 405 included in the description structure 404 for showing the state of the subunit. The state list 405 is stored in a memory within the subunit, but here it is shown like a hierarchical structure to show the contents in simplified form.

The state list 405 comprises four broad categories: (1) list length, (2) general state, (3) receiving plug state, and (4) transmitting plug state.

The list length (1) indicates the length of the state list 405. Since the description structure 404 is made up of a plurality of lists, this list length is used to compute the starting address of the list that follows the state list 405. The general state (2) stores general information concerning the subunit, such as information indicating whether a medium is in the subunit, and in the case of a device error, the cause and the last executed command.

The receiving plug state (3) includes the number of receiving plugs (m) and the receiving plug state [x] (x=1 to m). In the illustrated prior art example, since the number of receiving plugs is one, only one receiving plug state is shown. The receiving plug state [x], whose detailed contents are shown at 406 in FIG. 6, consists of five portions, (a) receiving plug state length, (b) receiving plug number, (c) operating mode, (d) current position, and (e) plug setting.

The receiving plug state length (a) indicates the length of the receiving plug state portion. The receiving plug number (b) shows the identification number of the receiving plug. The operating mode (c) will be described in detail later. The current position information (d) indicates the current record position (music track number, etc.) on the medium currently associated with the receiving plug. How this is done depends on the media recording format; in the case of MD, the position is indicated by the track number and by hours:minutes:seconds:frames from the beginning of the track. In the plug setting portion (e) are stored a list identifier in the media recording hierarchy (in the case of MD, this automatically is a route list since MD does not have a recording hierarchical structure), recording format (audio, video, MIDI, still image, etc.), and detailed information concerning the recording format (in the case of audio, sampling frequency, sampling bit length, compression scheme, number of recording channels, etc.). The plug setting comprises one that beforehand the subunit has as unique values and is not alterable from the outside (for example, MD sampling frequency, sampling bit length, compression scheme, etc.) and the other that is alterable from the outside depending on the subunit (number of recording channels: selection between monaural and stereo, for example).

The operating mode (c) will be described in detail below. Table 1 shows the operating mode and operating mode specific information. The operating mode for the receiving plug is classified into three modes, STOP, RECORD, and SUSPEND, with two subfunctions provided for RECORD and reasons attached to SUSPEND.

TABLE 1

| Operating mode | Operating mode specific information | |
|---|---|---|
| Stop | — | |
| Record | Forward | New/Overwrite |
| | Forward pause | |
| | Time machine | |
| Suspend | No media | |
| | Media-importing | |
| | Media-exporting | |
| | Writing TOC | |
| | Reading TOC | |
| | Capacity exceed | |
| | Unknown | |

The RECORD subfunction 1 "TIME MACHINE" is a function that starts recording from input data which is stored in MD memory and is before receiving a record command. The subfunction 2 "NEW" is a mode for newly recording in an unrecorded area of the disc, while "OVERWRITE" is a mode for overwriting an already recorded area.

Of the suspend reasons, "NO MEDIA" indicates that the subunit is not in a condition ready for loading or unloading a medium (in the case of a tray type device, the tray is closed) and no media are loaded into it.

"READING TOC (Table of Contents, data concerning areas where the contents of the MD are stored)" indicates that the subunit is automatically reading the TOC, for example, when a new medium is loaded into the subunit. "WRITING TOC" indicates that necessary writing process is being done to the TOC when the contents of the medium are altered, for example, when audio data is recorded or when an edit command is executed. The timing to actually write the TOC depends on the device. In some devices, writing is done to the TOC immediately after the contents of the medium are altered, and in others, the altered contents are stored in a semiconductor memory or the like within the device, and writing is done to the TOC when a command for unloading the medium or a command for turning off power is received.

The suspend reason "CAPACITY EXCEED" indicates that in a device such as an HDD (hard disk drive) capable of handling a plurality of streams using one head, the necessary transmission capacity cannot be secured for the stream that the plug is going to handle because of already input or output streams. Accordingly, this reason need not be indicated in the case of MD, etc. that include only one input and one output.

The operating mode can be divided between modes (RECORD, STOP, etc. )that are controlled by externally entering special operation commands and modes (SUSPEND/READING TOC, RECORDING STOP due to media recording capacity full, etc.) that the subunit automatically effects. The operating mode can only be read from the outside and cannot be written directly.

The transmitting plug state (4) in the state list 405 consists of six portions, (a) transmitting plug state length, (b) transmitting plug number, (c) operating mode, (d) current position, (e) recording format, and (f) plug setting (see Table 2).

TABLE 2

| operating mode | operating mode specific information |
|---|---|
| stop | — |
| playback | slow forward |
| | normal forward |
| | fast forward |
| | slow reverse |
| | normal reverse |
| | fast reverse |
| | forward pause |
| | reverse pause |
| monitor | — |
| search | track relative time |
| | absolute time |
| | relative unit |
| | absolute unit |
| suspend | no media |
| | media-importing |
| | media-exporting |
| | reading TOC |
| | writing TOC |
| | (capacity exceed) |
| | unknown |

Operating mode: The operating mode specific information for SEARCH indicates the position to be searched for.

Track relative time: A search command such as "Search for the 40-second position in track 4".

Absolute time: Indicates the time from the beginning of the entire contents.

Relative unit: Specifies how many units after or before from the unit currently being played back (the unit is the contents unit corresponding to the track on MD or CD.

Absolute unit: Specifies a unit as counted from the beginning of the entire contents.

Next, an example of the case where data is recorded using the plug will be described below. In the example described here, a CD player is used as the transmitting device and an MD recorder as the receiving recording device, and these devices are controlled by an external controller. In this prior art example, data played back on the transmitting device (CD player) is recorded by the receiving device (MD recorder) in the "NEW" mode.

Figure 7:
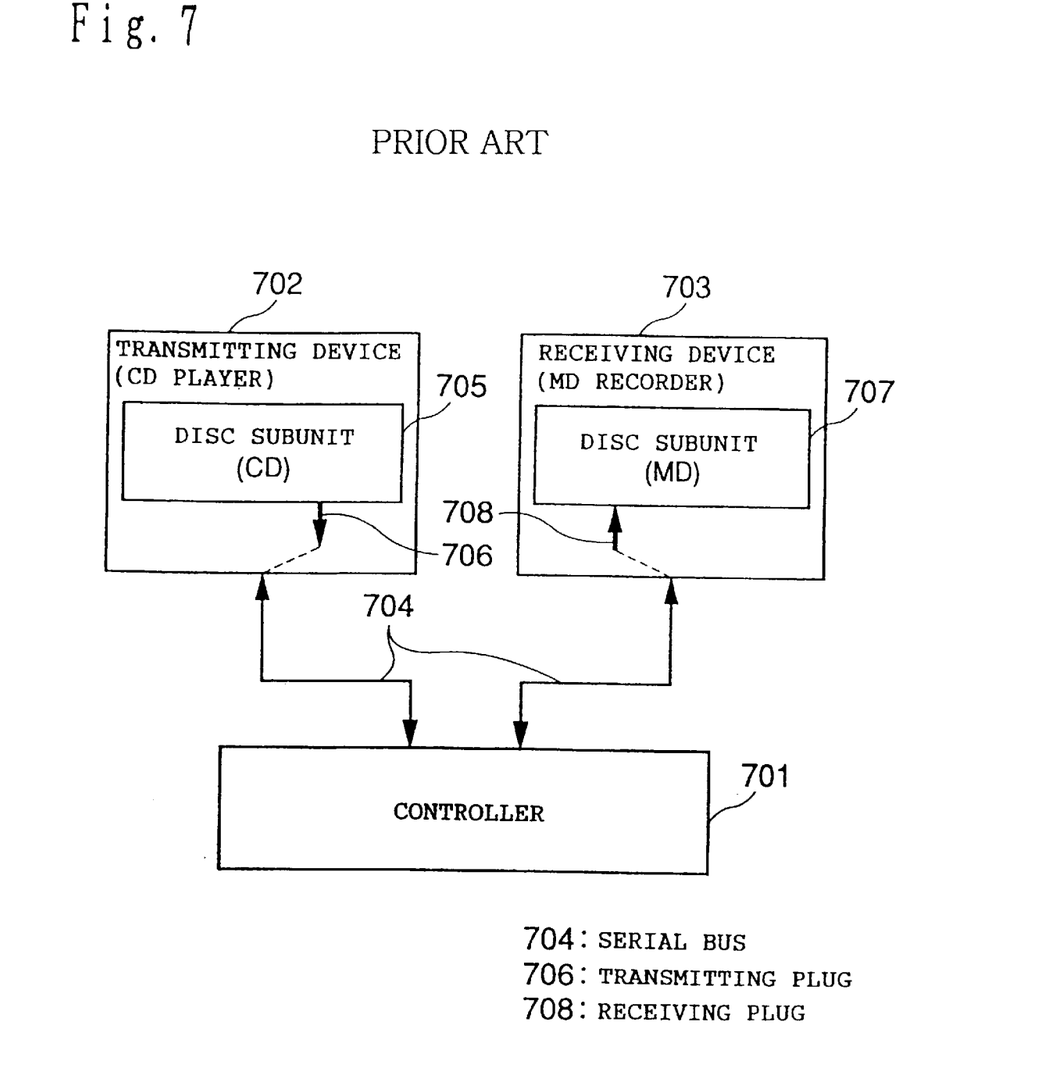
FIG. 7 is a block diagram showing the connections of a transmitting device, a receiving device, and a controller.

FIG. 7 shows the connections of the controller 701, the transmitting device (CD player) 702, and the receiving device. The controller 701, the transmitting device (CD player) 702, and the receiving device (MD recorder) 703 are connected by a serial bus 704. The transmitting device (CD player) 702 contains a disc subunit (CD) 705, and outputs isochronous data on the serial bus 704 via a transmitting plug 706. The receiving device (MD recorder) 703 also contains a disc subunit (MD) 707, and receives isochronous data from the serial bus 704 via a receiving plug 708. Control data also is transmitted to each subunit via the serial bus 704. Control data packets each carry an address specifying the destination device, and only the specified device processes the packet. The path for transmitting/receiving the control data between the serial bus 704 and each subunit is not specifically shown by Figures.

Figure 8:
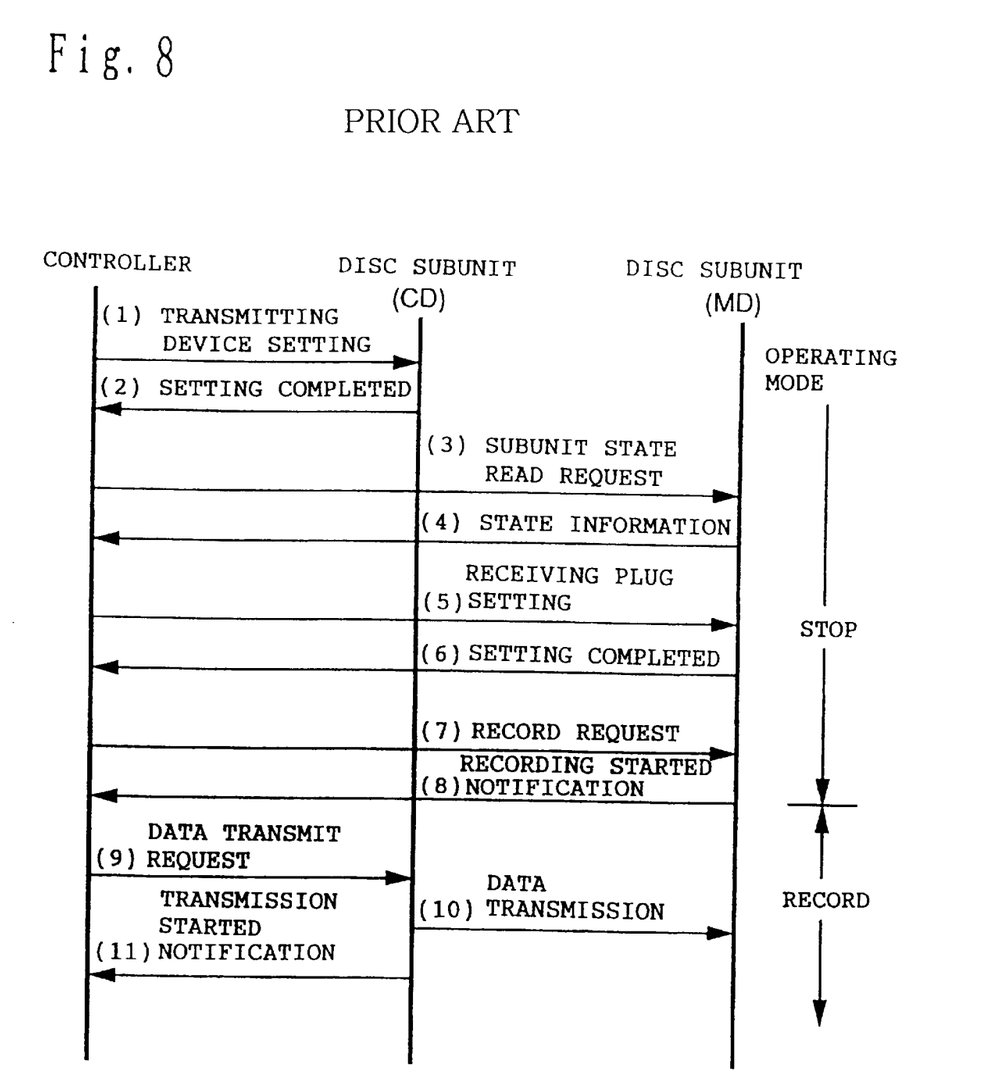
FIG. 8 is a diagram showing the transmit/receive of control signals among a disc subunit (MD), a controller, and a disc subunit (CD) according to the prior art.

FIG. 8 is a diagram showing the transmit/receive of control signals among the disc subunit (MD) 707, the controller 701, and the disc subunit (CD) 705. First, (1) the controller 701 makes detailed settings for the disc subunit (CD) 705 as the transmitting device. More specifically, the settings include the setting of a play list (a list specifying the sequence of playback in programmed playback mode), the designation of the playback positions, and the setting of the transmitting plug 706. These settings are respectively made using special commands, to each of which the disc subunit (CD) 705 returns a response, such as setting completed or denied, to the controller 701. For simplicity, the response is shown here represented by setting completed (2).

Next, the controller 701 issues a subunit state read request (3) to request and read the state of the disc subunit (MD) 707. The disc subunit (MD) 707 returns the contents of the state list as state information (4) to the controller 701. Here, it is assumed that the operating mode of the disc subunit (MD) 707 is "STOP". Since the operating mode of the disc subunit (MD) 707 is "STOP", the controller 701 can determine that recording will be possible in the "NEW" mode. Then, (5) the controller 701 makes detailed settings for the disc subunit (MD) 707 as the receiving plug. More specifically, the settings include the setting of recording channels (monaural or stereo), etc. The disc subunit (MD) 707 returns setting completed (6) to the controller 701 as a setting completed notification. The controller 701 sends a record request ("NEW" mode) (7) to the disc subunit (MD) 707 to request recording. The disc subunit (MD) 707 returns recording started (8) to the controller 701 as a recording started notification. At this time, the operating mode of the disc subunit (MD) 707 changes from STOP to RECORD.

The controller 701 sends a transmit request as a data transmit request (9) to the disc subunit (CD) 705, and the disc subunit (CD) 705 starts transmitting data to the disc subunit (MD) 707 as indicated by data transmission (10), while at the same time, sending a transmission started notification (11) to notify the controller 701.

With the above sequence of operations, data from the disc subunit (CD) 705 is recorded on the disc subunit (MD) 707.

However, the above conventional method has had the problem that when the operating mode of the subunit is SUSPEND, there are no set rules defining in what sequence the reasons for suspend are to be displayed or which reason is to be displayed in preference to others.

For example, when the digital input signal is an audio bit stream defined by IEC 958, if the PLL (phase locked loop) for reproducing the clock for the input signal is not in lock, the input signal can neither be handled nor be recorded as a matter of course; since the out-of-lock condition is a very important reason for suspend, such a reason must always be displayed in preference to any other reason, but this was not always the case with the prior art.

DISCLOSURE OF THE INVENTION

The present invention has been devised to overcome the above problem, and provides a data receiving device and a data transmitting device wherein each suspend reason is classified in advance so that an important reason can be displayed in preference to others.

Accordingly, the present invention is a signal data receiving device for at least receiving data via a digital interface, comprising:

receiving terminal data holding means for holding data concerning a state of a terminal via which data is received, and wherein said terminal state data includes terminal operating mode information, suspend reasons concerning suspend in said operating mode information are classified using at least a receiving data state and a device operation state as classification criteria, and these classifications and each classified suspend reason are capable of being displayed on another device connected to said digital interface.

Further, the present invention is a signal data transmitting device for at least transmitting data via a digital interface, comprising:

transmitting terminal data holding means for holding data concerning the state of a terminal via which data is transmitted, and wherein said terminal state data includes terminal operating mode information, suspend reasons concerning suspend in said operating mode information are classified using at least a transmitting data state and a device operation state as classification criteria, and these classifications and each classified suspend reason are capable of being displayed on another device connected to said digital interface.

Still further, the suspend reasons of the present invention are displayed according to priority predetermined among said classification criteria.

In this way, when a plurality of suspend reasons occur simultaneously, the suspend reasons are selectively displayed according to the predetermined priority.

DESCRIPTION OF REFERENCE NUMERALS

101,401 disc subunit
102,402 receiving plug
103,403 transmitting plug
104,404 description structure
105 state list

BEST MODE FOR CARRYING OUT THE INVENTION

Embodiments of the present invention will be described below with reference to drawings. Each embodiment hereinafter described deals with an example in which priorities are provided in the above-described invention in indicating the suspend reasons.

(Embodiment 1)

Figure 1:
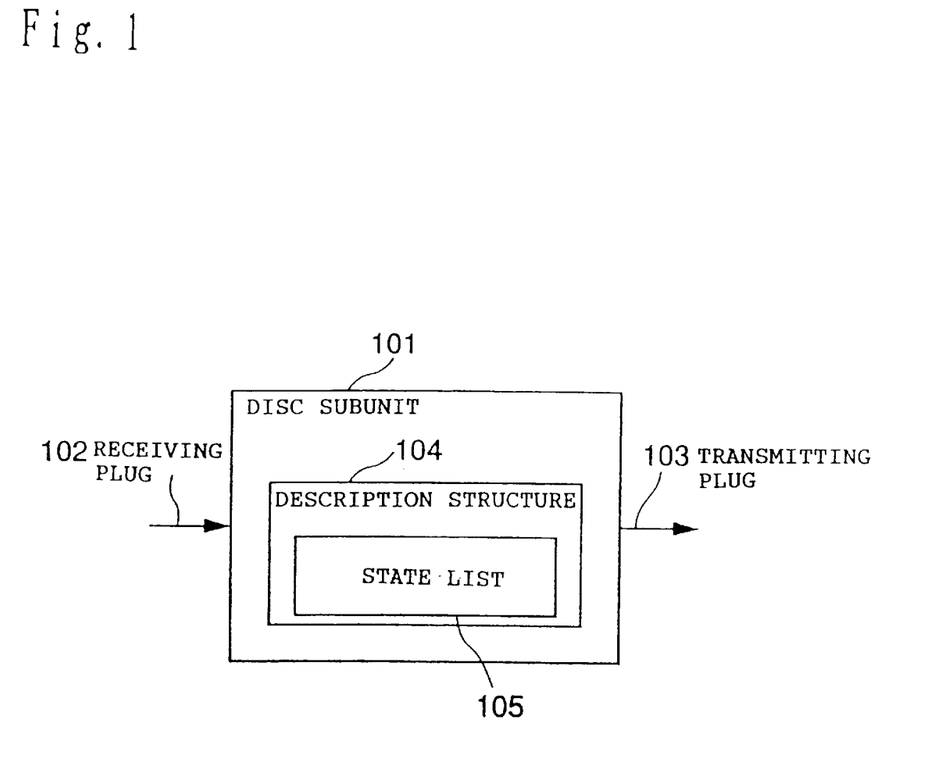
FIG. 1 is a block diagram showing the configuration of a subunit in a data receiving/transmitting device according to a first embodiment of the present invention.
Figure 2:
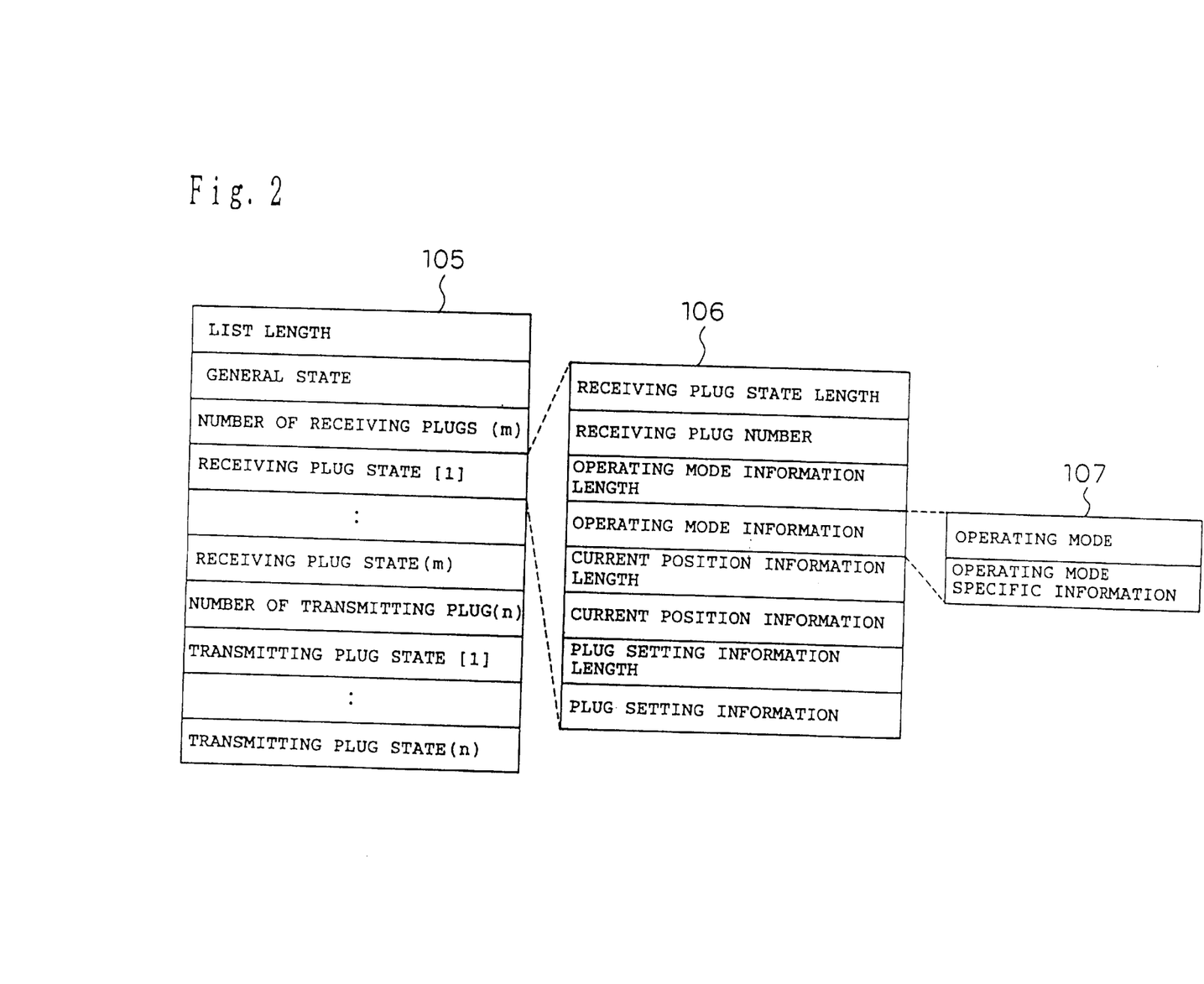
FIG. 2 is a conceptual diagram showing the structure of a state list in the data receiving/transmitting device.

FIG. 1 is a block diagram showing the configuration of a subunit which implements a data transmission and reception method according to a first embodiment of the present invention. FIG. 2 is a diagram showing a state list in the form of a hierarchical structure.

In FIG. 1, reference numeral 101 is the disc subunit, 102 is a receiving plug, 103 is a transmitting plug, 104 is a description structure, and 105 is the state list.

The description structure 104 includes the state list 105, as in the prior art example. The state list 105, as shown in FIG. 2, provides a receiving plug state 106 as a receiving terminal data holding means. As in the prior art example, this receiving plug state 106 also includes operating mode information 107. The operating mode and operating mode specific information according to this embodiment are shown in Table 3.

TABLE 3

| Operating mode | Operating mode specific information | | monitor |
|---|---|---|---|
| Stop | — | | POSSIBLE |
| Record | Forward<br>Forward pause<br>Time machine | New Overwrite | POSSIBLE |
| Suspend | RECEIVED DATA | DIGITAL INPUT NOT LOCKED | NOT POSSIBLE |
| | | COPY PROTECT | POSSIBLE |
| | | (CAPACITY EXCEED) | POSSIBLE |
| | RECORDING MEDIA | NO MEDIA<br>DEFECTIVE DISC<br>READ-ONLY DISC<br>WRITE PROTECT | POSSIBLE |
| | DEVICE OPERATION | media-importing<br>media-exporting<br>writing TOC<br>reading TOC<br>PLAYING BACK<br>SEARCHING | POSSIBLE |
| | UNKNOWN | unknown | NOT POSSIBLE |

The operating mode "SUSPEND" is largely classified into four states, "RECEIVED DATA", "RECORDING MEDIA", "DEVICE OPERATION", and "UNKNOWN". "RECEIVED DATA" provides suspend reasons attributable to the data itself. "DIGITAL INPUT NOT LOCKED" indicates that data reception is not possible because the PLL for the reception of a digital audio signal defined by IEC 958, for example, is not in lock. When the external controller reads the receiving plug state and finds the state as "DIGITAL INPUT NOT LOCKED", the controller can take such action as checking the disc subunit (CD) 705 while also checking the setting, etc. of the disc subunit (CD) 705 as the CD play data sending unit.

"COPY PROTECT" indicates that though the PLL is locked and data is successfully received, new recording cannot be made to the medium because data copy inhibit flag is ON. When the controller finds this situation, the controller takes such action as notifying the user that the data is copy protected. In this case, recording cannot be made, but monitor is possible. "CAPACITY EXCEED" is the same as that in the prior art example; this suspend reason, however, does not occur in the case of the current MD version.

"RECORDING MEDIA" indicates that the received data itself can be recorded but the recording cannot be done for a reason attributable to the recording medium. If there also exists a reason that is attributable to the received data, the operating mode is set by giving priority to that reason.

"RECORDING MEDIA" includes reasons "DEFECTIVE DISC", "READ-ONLY DISC", and "WRITE INHIBITED" in addition to "NO MEDIA" included in the prior art example. When the controller reads these reasons, the controller can advise the user to change recording media or unprotect the write-protected medium. Even if recording cannot be done for any reason attributable to the recording medium, monitor is possible. However, many audio devices are not equipped with a special switch for monitor, but are designed to automatically enter the monitor mode when placed in recording standby state. In such cases, if there is no problem with the received signal, some devices cannot be placed in the recording standby state for a reason attributable to the recording medium and thus may not be able to perform the monitor function.

"DEVICE OPERATION" indicates that both the received data and the recording medium are ready for recording but the recording cannot be done because of the operating mode of the device at that time. If there also exists a reason attributable to the received data or the recording medium, the operating mode is set by giving priority to that reason. In the case of "IMPORTING", "EXPORTING", "WRITING TOC", "READING TOC", and "SEARCHING", the command is such that a notification is issued when the operation concerned is completed, and the next operation waits until the notification arrives. In the case of "PLAYING BACK", the playback operation can be stopped by sending a stop command. For "PLAYING BACK" and "SEARCHING", depending on the device used, it is possible to design so that the search is forcefully terminated to enter a record mode; therefore, in some devices, neither "PLAYING BACK" nor "SEARCHING" constitutes a suspend reason. In the case of the suspend reasons attributable to the device operation, monitor is possible.

Next, an example of how data is recorded using the plug will be described below. Here, a CD player is used as the transmitting device and an MD as the recording subunit, as in the prior art example, and these devices are controlled by an external controller. The disc subunit (MD), the transmitting device, and the controller are connected by a serial bus. Data played back on the CD player is recorded on the MD in the "NEW" mode. The connections of these devices are the same as those shown in FIG. 7.

Figure 3:
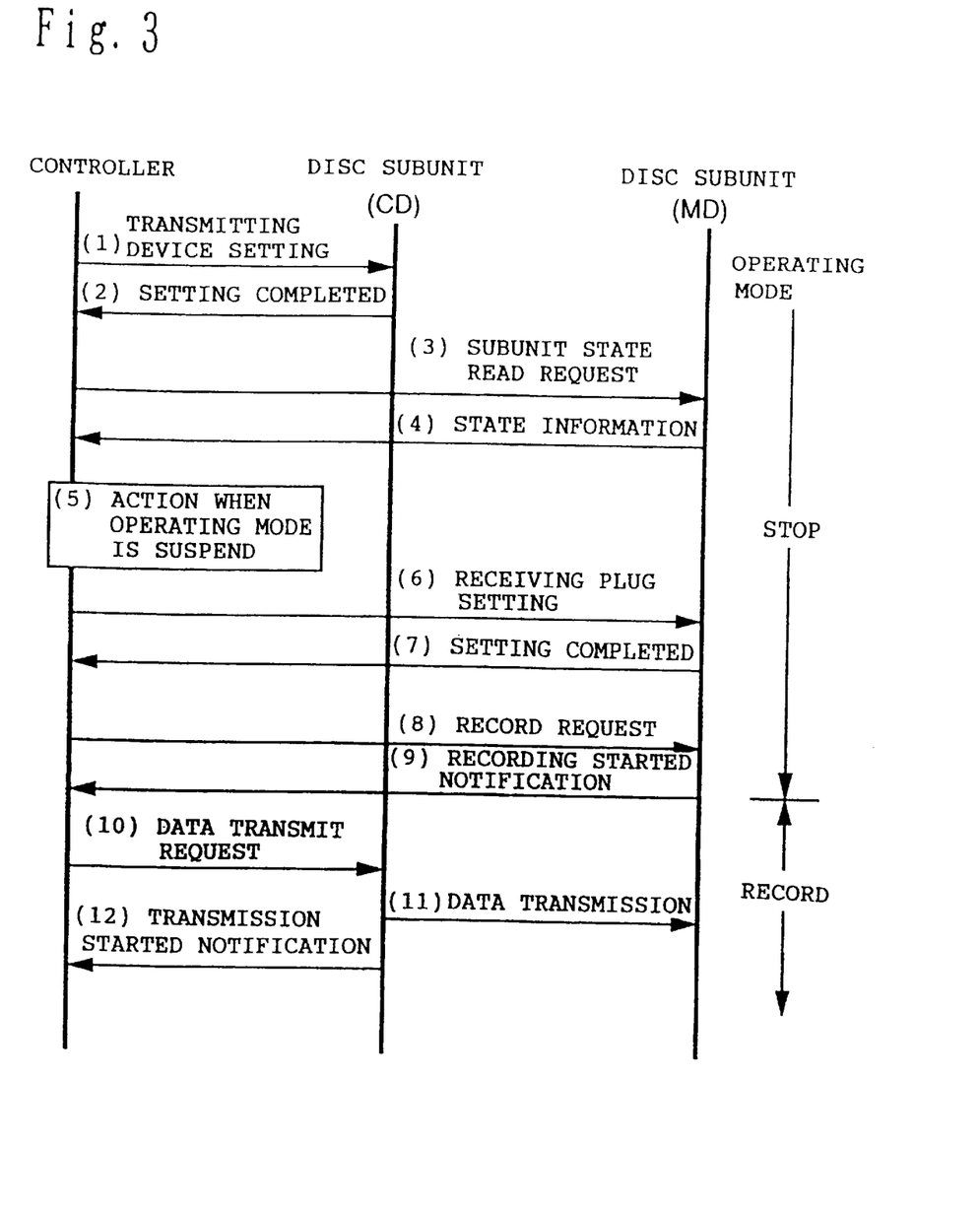
FIG. 3 is a diagram showing the transmit/receive of control signals among a disc subunit (MD), a controller, and a disc subunit (CD) in the data receiving/transmitting device.

FIG. 3 is a diagram showing the transmit/receive of control signals among the disc subunit (MD) 707, the external controller 701, and the disc subunit (CD) 705.

First, as the transmitting device setting (1), the controller 701 makes settings for the disc subunit (CD) 705. More specifically, the settings include the setting of the play list, the designation of the playback position, the setting of the transmitting plug 706, and the like. These settings are made using special commands, to each of which the disc subunit (CD) 705 returns a response, such as setting completed or denied, to the controller 701. For simplicity, the response is shown here represented by setting completed (2).

Next, the controller 701 issues a subunit state read request (3) to read the state of the disc subunit (MD) 707. The disc subunit (MD) 707 returns the contents of the state list as state information (4) to the controller 701. When the operating mode of the disc subunit (MD) 707 is "STOP", the controller 701 can immediately determine that recording will be possible in the "NEW" mode. However, when the operating mode is "SUSPEND", the reason is examined and, if the reason is found, appropriate action such as described earlier is taken as the action when the operating mode is "SUSPEND" (5). When the operating mode of the plug changes to "STOP", the controller 701 makes settings for the receiving plug 708 of the disc subunit (MD) 707 as the receiving plug setting (6). More specifically the settings include the setting of recording channels (monaural or stereo), etc. The disc subunit (MD) 707 returns setting completed (7) to the controller 701 as a setting completed notification. The controller 701 sends a record request ("NEW" mode) (8) to the disc subunit (MD) 707 to request recording. The disc subunit (MD) 707 returns recording started (9) to the controller 701 as a recording started notification. At this time, the operating mode of the disc subunit (MD) 707 changes from STOP to RECORD.

The controller 701 sends a transmit request as a data transmit request (10) to the disc subunit (CD) 705, and the disc subunit (CD) 705 starts transmitting data to the disc subunit (MD) 707 as indicated by data transmission (11), while at the same time, sending a transmission started notification (12) to notify the controller 701.

With the above sequence of operations, data from the disc subunit (CD) 705 is recorded on the disc subunit (MD) 707.

If monitor is to be performed, not recording, there are cases where the monitor is possible even when the operating mode is "SUSPEND", and in such cases, monitor can be performed by sending a monitor command.

As described above, according to the data transmission and reception method of the present embodiment, the receiving terminal data holding means for holding a collection of data transmitting terminal states is provided, and the receiving terminal data holding means includes terminal operating mode information and, when the operating mode is "SUSPEND", indicates as a suspend reason the received data state or the device operation state, or the recording media state when the device handles recording media, while selectively displaying reasons according to predetermined priority when more than one reason occurs simultaneously; in this way, by just examining the operating mode, it is possible to know whether the device can perform recording and, if recording is not possible, then the reason. In the case of monitor also, it is possible to know whether the monitor is possible or not and, if not possible, then the reason.

The received data, recording media, and operating mode can also be displayed using respectively separate methods.

However, the present invention displays a plurality of causes in one display field in accordance with predetermined priority and thereby allows the cause to be known using a communication procedure with reduced complexity; this is effective in terms of time and resources.

(Embodiment 2)

The first embodiment has dealt primarily with the receiving plug, but the same thing can be implemented for the transmitting plug also. As a second embodiment, the transmitting side will be described in some detail below.

Figure 4:
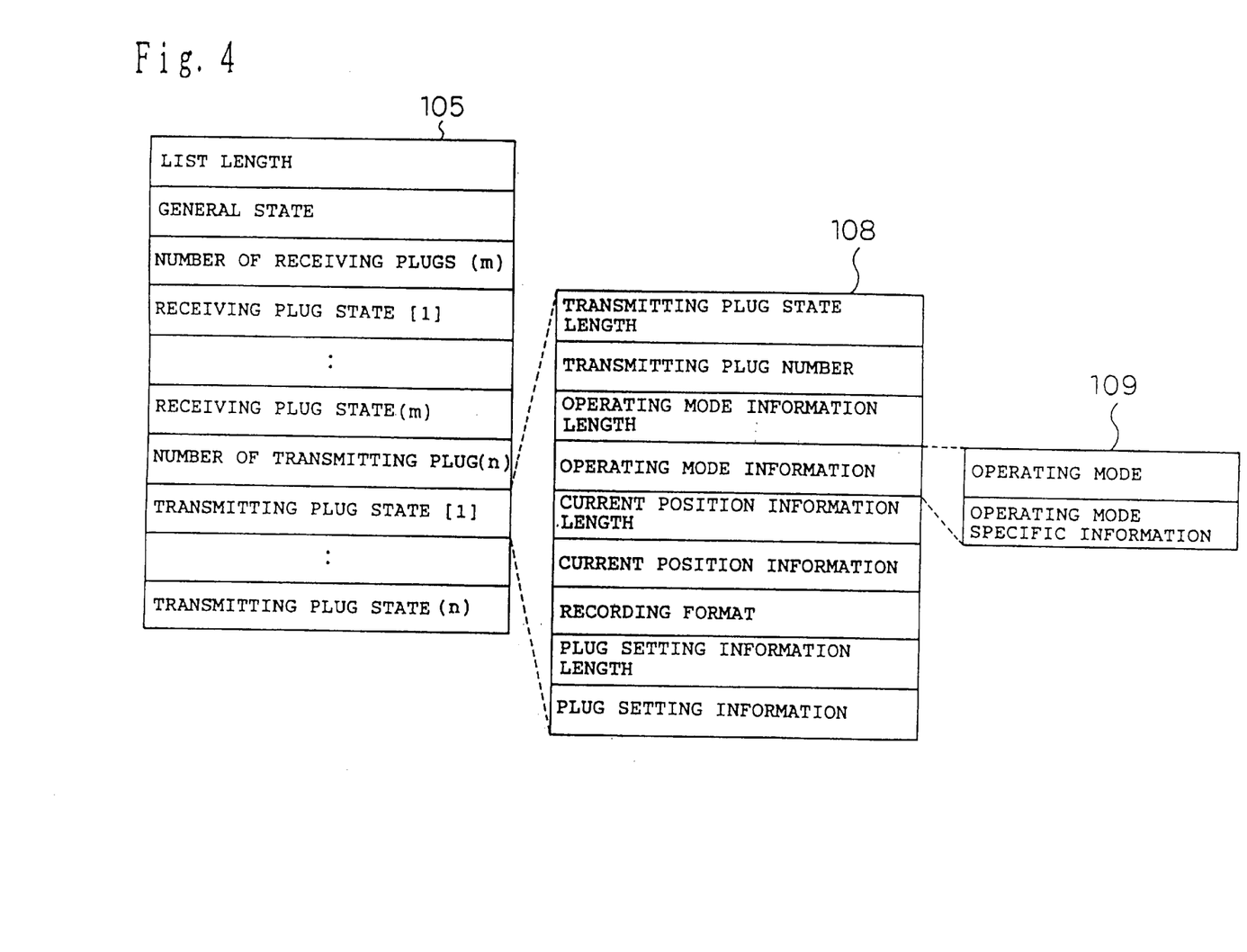
FIG. 4 is a conceptual diagram showing the structure of a state list in a data receiving/transmitting device according to a second embodiment of the present invention.

FIG. 4 is a diagram showing the concept of a transmitting plug state 108 as a transmitting terminal data holding means.

The transmitting plug state consists of six portions, i.e., transmitting plug state length, transmitting plug number, operating mode, current position, recording format, and plug setting. Operating mode information 109 defines five modes, i.e., stop, playback, monitor, suspend, and search, with reasons provided for suspend. Suspend reasons are displayed by giving priority to recording media, device operation, and unknown in this order, thus allowing the controller to easily identify the cause when playback is not possible and thereby to quickly take appropriate action. Table 4 shows the operating mode for the transmitting plug.

TABLE 4

| Operating mode | Operating mode specific information | |
|---|---|---|
| STOP | — | |
| PLAYBACK | NORMAL FORWARD | |
| | forward pause | |
| | FAST/SLOW FORWARD | |
| | NORMAL REVERSE | |
| | reverse pause | |
| | FAST/SLOW REVERSE | |
| MONITOR | — | |
| SEARCH | — | |
| SUSPEND | TRANSMIT DATA | (CAPACITY EXCEED) |
| | RECORDING MEDIA | NO MEDIA |
| | | DEFECTIVE DISC |
| | DEVICE OPERATION | media-importing |
| | | media-exporting |
| | | writing TOC |
| | | reading TOC |
| | | writing |
| | UNKNOWN | unknown |

The operating mode for the transmitting plug is classified into five modes, STOP, PLAYBACK, MONITOR, SEARCH, and SUSPEND, with one subfunction provided for PLAYBACK and reasons attached to SUSPEND.

The playback subfunction includes normal speed playback, fast speed playback, slow speed playback, and pause in both the forward and reverse directions. There are several finer speed settings for fast and slow speed playback, but in the illustrated example, these are represented by fast and slow, respectively.

MONITOR is a mode for transmitting the input signal unaltered as it is received from the receiving plug, and is independent of the operation of disc media. SEARCH is a mode during which a particular position on the medium is being searched for.

The reasons for the operating mode "SUSPEND" are largely classified into four categories: transmit data, recording media, device operation, and unknown.

"TRANSMIT DATA" concerns a reason attributable to the data itself. "CAPACITY EXCEED" is the same as that described in the prior art example. This indicates that in a device such as an HDD capable of handling a plurality of streams using one head, the necessary transmission capacity cannot be secured for the stream that the plug is going to handle because of already input or output streams. This suspend reason does not occur in the case of the current MD version.

"RECORDING MEDIA" indicates that playback is not possible for a reason attributable to the medium holding the data to be played back. In a device such as a hard disk capable of transmitting a plurality of data streams simultaneously, if there also exists a reason attributable to the transmit data, that reason takes precedence over the reason attributable to the recording medium.

"RECORDING MEDIA" consists of "NO MEDIA" and "DEFECTIVE DISC". When the controller reads these reasons, the controller can advise the user to change recording media, for example. When playback cannot be performed for a reason attributable to the recording medium, monitor is possible. However, many audio devices are not equipped with a special switch for monitor, but are designed to automatically enter the monitor mode when placed in recording standby state. In such cases, some devices cannot be placed in the recording standby state for a reason attributable to the recording medium and thus may not be able to perform the monitor function.

"DEVICE OPERATION" indicates the state in which both the transmit data and the recording medium are ready for playback but the playback cannot be performed because of the operating mode of the device at that time. If there also exists a reason attributable to the transmit data or the recording medium, the operating mode is set by giving priority to that reason. In the case of "MEDIA IMPORTING", "MEDIA EXPORTING", "RECORDING TOC", and "READING TOC", the command is set such that a notification is issued when the operation concerned is completed; in that case, the playback is retried after the arrival of the notification. In the case of "RECORDING", the recording operation can be stopped by sending a stop command.

As described above, the transmitting terminal data holding means for holding a collection of data transmitting terminal states is provided, and the transmitting terminal data holding means includes terminal operating mode information and, when the operating mode is "SUSPEND", indicates as a suspend reason the transmit data state or the device operation state, or the recording media state when the device handles recording media, while selectively displaying reasons according to predetermined priority when more than one reason occurs simultaneously; in this way, by just examining the operating mode, it is possible to know whether the device can perform playback and, if playback is not possible, then the reason. In the case of monitor also, it is possible to know whether the monitor is possible or not and, if not possible, then the reason.

POTENTIAL FOR EXPLOITATION IN INDUSTRY

As described above, according to the data transmission and reception method of the present invention, the receiving terminal data holding means for holding a collection of data receiving terminal states or the transmitting terminal data holding means for holding a collection of data transmitting terminal states is provided, and each terminal data holding means includes terminal operating mode information and, when the operating mode is "SUSPEND", indicates as a suspend reason the received data or transmit data state or the device operation state, or the recording media state when the device handles recording media, while selectively displaying reasons according to predetermined priority when more than one reason occurs simultaneously; this offers the excellent effect that with a simple procedure involving just examining the operating mode, it is possible to know whether the device can perform recording and, if recording is not possible, then the reason. In the case of monitor also, it is possible to know whether the monitor is possible or not and, if not possible, then the reason.

What is claimed is:

1. A signal data receiving device for at least receiving data via a digital interface, comprising:
    receiving terminal data holding means for holding data concerning a state of a terminal via which data is received, and wherein
      said terminal state data includes terminal operating mode information,
      suspend reasons concerning suspend in said operating mode information are classified using at least a receiving data state and a device operation state as classification criteria, and
      these classifications and each classified suspend reason are capable of being displayed on another device connected to said digital interface.

2. A data receiving device according to claim 1, wherein when said data receiving device handles recording media, said suspend reasons are classified based not only on said receiving data state and said device operation state, but also on a recording media state.

3. A data receiving device according to claim 1, wherein said suspend reasons are displayed according to priority predetermined among said classification criteria.

4. A data receiving device according to claim 3, wherein said priority is given in such order of said receiving data state and said device operation state.

5. A data receiving device according to any one of claims 1 to 4, wherein information as to whether monitor is possible or not is appended to each of said suspend reasons.

6. A signal data transmitting device for at least transmitting data via a digital interface, comprising:
    transmitting terminal data holding means for holding data concerning the state of a terminal via which data is transmitted, and wherein
      said terminal state data includes terminal operating mode information,
      suspend reasons concerning suspend in said operating mode information are classified using at least a transmitting data state and a device operation state as classification criteria, and
      these classifications and each classified suspend reason are capable of being displayed on another device connected to said digital interface.

7. A data transmitting device according to claim 6, wherein when said data transmitting device handles recording media, said suspend reasons are classified based not only on said transmitting data state and said device operation state, but also on a recording media state.

8. A data transmitting device according to claim 6 or 7, wherein said suspend reasons are displayed according to priority predetermined among said classification criteria.

9. A data transmitting device according to claim 8, wherein said priority is given in such order of said transmitting data state and said device operation state.

10. A data transmitting device according to any one of claim 6 or 7, wherein information as to whether monitor is possible or not is appended to each of said suspend reasons.

11. A program medium having stored thereon all or part of programs for implementing by a computer all or part of functions of each means in the device described in any one of claims 1, 2, 3, 4, 6, or 7.

12. A data receiving device according to claim 2, wherein said suspend reasons are displayed according to priority predetermined among said classification criteria.

13. A data receiving device according to claim 12, wherein said priority is given in such order of said receiving data state and said device operation state.

14. A data receiving device according to claim 12, wherein information as to whether monitor is possible or not is appended to each of said suspend reasons.

15. A data receiving device according to claim 13, wherein information as to whether monitor is possible or not is appended to each of said suspend reasons.

16. A program medium having stored thereon all or part of programs for implementing by a computer all or part of functions of each means in the device described in claim 12.

17. A program medium having stored thereon all or part of programs for implementing by a computer all or part of functions of each means in the device described in claim 13.

* * * * *